Jan. 4, 1966   J. C. NOVELLO   3,226,880
ILLUMINATED FIGURE TOY
Original Filed March 13, 1961
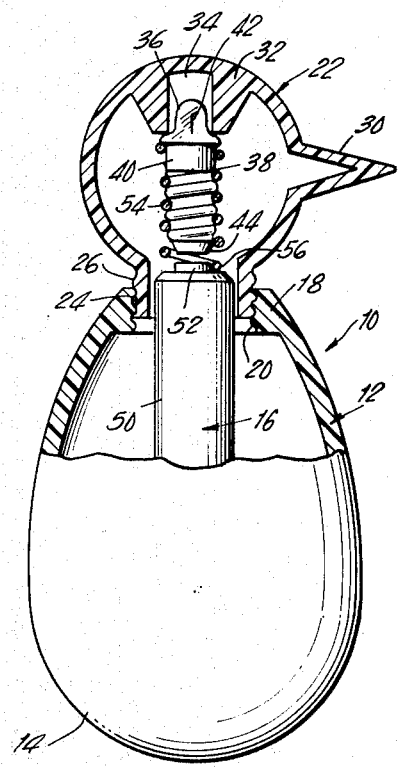
INVENTOR.
JOHN C. NOVELLO
BY
ATTORNEYS 3,226,880
Patented Jan. 4, 1966

3,226,880
ILLUMINATED FIGURE TOY
John C. Novello, 32 Coolidge St., North Bellmore, N.Y.
Original application Mar. 13, 1961, Ser. No. 95,278, now Patent No. 3,092,076, dated June 4, 1963. Divided and this application Jan. 29, 1963, Ser. No. 254,729
1 Claim. (Cl. 46—228)

This application is a division of application Serial No. 95,278, filed March 13, 1961, for Parakeet Toy, and now Patent No. 3,092,076, issued June 4, 1963.

This invention relates to a device for use in animal husbandry, and more particularly to a parakeet toy for use in a cage for a parakeet.

Various species of birds, such as parakeets, provide considerable pleasure to human beings as pets. These parakeets or other species of birds are generally kept in cages. Pet parakeets should be allowed to exercise by flying about the room or rooms of a home or other building in which they are kept and, generally speaking when once allowed to fly out of the cage, it is often very hard to persuade the parakeet to return to its cage or to recapture the parakeet.

Parakeets should be provided with the toys for drawing their attention and for enabling them to pass the time of day quite happily in order that they may survive captivity with the greater success. Further, toys often provide considerable entertainment for the parakeet and for the pet owner who can enjoy watching the parakeet play with such toys.

It is therefore an object of the present invention to provide a toy which can be used in a cage of a parakeet, or other type of bird, so as not only to provide a toy for the parakeet, but also to enable the parakeet to be lured back into the cage.

A further object of the present invention is to provide means for luring a parakeet or like pet back into its cage which may be conveniently installed in the cage so as to be capable of being readily actuated, and which means may be in the form of a light which is highly attractive to parakeets and the like.

An additional object of the invention is to provide a toy for use in combination with a cage for a parakeet or like pet which may be simply actuated so as to excite a lamp forming a part of the toy whereby the light emanating from the lamp will lure the parakeet or other pet back into the cage.

The concept of this invention features a parakeet toy for use in a cage including a casing in the cage with a battery being provided in the casing. A movable member is threadedly adjustably secured to the casing so that a lamp which is normally pressed away from the battery by an electrically conductive spring may be urged against the battery to complete an operative electrical circuit to the lamp from the battery through the spring when the movable member is given a minor amount of movement.

Still further objects and features of this invention reside in the provision of a parakeet toy or the like that is simple in construction, inexpensive to manufacture, and highly attractive in appearance.

These, together with the various ancillary objects and features of the invention which will become apparent as the following description proceeds, are attained by this device for use in animal husbandary, a preferred embodiment of which is illustrated in the accompanying drawing, by way of example only, wherein:

The figure is an elevational view with parts in section of an embodiment of the parakeet toy.

With continuing reference to the accompanying drawing wherein like reference numerals designate similar parts, reference numeral 10 designates the toy which simulates the configuration of a penguin or similar type animal is shown. The toy 10 includes a casing 12 in the form of a body which has a spherical base 14 preferably weighted as with lead or other suitable material to form a seat for the lower end of a battery 16 which is positioned in the casing 12. The upper end of the body which is substantially hollow is provided with a thickened portion 18 and internally threaded as at 20. A movable member 22 has a neck portion 24 provided with external threading 26 so as to be threadedly engageable with the internal threads 20 of the casing 12. The movable member 22 is configurated to simulate the head of a penguin, bird or other simulated animal and may include configurations as at 30 which simulate the nose or other features of an animal. The movable member 22 is provided with an internal thickened portion 32 provided with a recess 34 for receiving the bulb 36 of a lamp 38. The lamp 38 includes a conductive shell 40, filaments 42, and base contact 44. The battery 16 includes an outer conductive shell 50 and a terminal 52. A spring 54 is disposed about the shell 40 of the lamp 38 and normally urges the lamp 38 away from the battery 16 with the spring 54 having its lower-most coil 56 engaging the conductive shell 50 of the battery 16. The movable member 22 is preferably formed of a translucent or transparent light transmitting material such as polyvinyl chloride, polyurethene, or polystyrene. Upon rotation of the movable member 22, the threaded engagement of the neck portion 24 with the threads 20 will cause the lamp 38 to be lowered so that the base contact 44 engages terminal 52 to complete an operative electrical circuit from the battery shell 50 through the spring 54 through the shell 40 of the lamp 38 to the filaments 42 thereof, and thence from the filaments back to the base contact 44, to the terminal 52 of the battery 16.

The toy 10 is adaptedly placed in a cage on any suitable portion thereof such as the base. The parakeet can readily play with the toy and when the toy is swung by the parakeet applying its beak or part thereof to the toy, the toy will always recover the vertical position due to the fact that it is weighted at the spherical bottom portion 14 thereof. The center of gravity of the entire toy is adjacent the bottom 14 of the toy. When it is desired to lure the parakeet back into its cage, the door of the cage is opened, after which the movable member 22 is given a quarter turn which causes the lamp 38 to be lowered into contact with the battery 16. Once the parakeet has been lured by the light emanating from the toy back into the cage, the movable member 22 is twisted in the opposite direction, cutting off the power of the lamp 38.

A latitude of modification, change and substitution is intended in the foregoing disclosure and in some instances some features of the invention will be employed without a corresponding use of other features. Accordingly, it is appropriate that the appended claim be construed broadly and in a manner consistent with the spirit and scope of the invention herein:

I claim:

A toy comprising a casing, a movable member threadedly adjustably secured to said casing, a battery in said casing and extending into said movable member, a lamp within said movable member, said movable member having an internal thickened portion provided with a recess, said lamp extending into said recess, an electrically conductive spring disposed between and electrically contacting the shell of said lamp and the outer electrode of said battery and normally urging said lamp into said recess and said battery apart from said lamp, said member engaging said lamp so that upon movement of said member toward said casing, the center electrode of said lamp is brought into electrical contact with the center electrode of said battery to complete an operative electrical circuit between said battery, said spring, and said lamp, said casing having a spherical shaped bottom portion, said casing being weighted with the center of gravity of said toy being adjacent the bottom thereof so that said toy will assume an upright position after being swingingly tilted, said movable member entirely enclosing said lamp and having a configurated portion simulating the face of an animal, said movable member being made of light-transmitting material.

References Cited by the Examiner

UNITED STATES PATENTS

| | | | |
|---|---|---|---|
| 2,059,977 | 11/1936 | Williams | 240—10.66 |
| 2,249,689 | 7/1951 | Gelardin | 240—10.68 |
| 2,611,214 | 9/1952 | Schur | 46—228 |
| 2,632,977 | 3/1953 | Valesek | 46—147 |

FOREIGN PATENTS 529,271  11/1940  Great Britain.

DELBERT B. LOWE, *Primary Examiner.*

RICHARD C. PINKHAM, *Examiner.*